United States Patent
Pacsai et al.

(10) Patent No.: US 6,904,796 B2
(45) Date of Patent: Jun. 14, 2005

(54) REMOTE TIRE MONITORING SYSTEMS TOOL

(75) Inventors: Ernest Pacsai, Wixom, MI (US); Thomas Kenny, Troy, MI (US); Carl Szasz, Ortonville, MI (US); Robert Gilling, Caro, MI (US)

(73) Assignee: G-5 Electronics, LLC, Troy, MI (US)

( * ) Notice: Subject to any disclaimer, the term of this patent is extended or adjusted under 35 U.S.C. 154(b) by 191 days.

(21) Appl. No.: 10/420,175

(22) Filed: Apr. 21, 2003

(65) Prior Publication Data

US 2004/0206167 A1 Oct. 21, 2004

(51) Int. Cl.[7] ............................................. G01M 17/02
(52) U.S. Cl. ..................................... 73/146.8; 73/146
(58) Field of Search ............................... 73/146, 146.8; 340/442

(56) References Cited

U.S. PATENT DOCUMENTS

| | | | |
|---|---|---|---|
| 4,951,501 A | 8/1990 | MacAnally et al. | 73/146.8 |
| 4,966,034 A | 10/1990 | Bock et al. | 73/146.5 |
| 5,302,939 A | 4/1994 | Downs et al. | 340/447 |
| 5,600,301 A * | 2/1997 | Robinson, III | 340/442 |
| 5,838,229 A | 11/1998 | Robinson, III | 340/442 |
| 5,963,128 A | 10/1999 | McCleeland | 340/447 |
| 6,005,480 A | 12/1999 | Banzhof et al. | 340/447 |
| 6,043,739 A | 3/2000 | Henderson | 340/468 |
| 6,163,255 A | 12/2000 | Banzhof et al. | 340/447 |
| 6,204,758 B1 | 3/2001 | Wacker et al. | 340/444 |
| 6,417,766 B1 | 7/2002 | Starkey | 340/447 |
| 6,438,461 B1 | 8/2002 | Desailly et al. | 700/280 |
| 6,486,773 B1 | 11/2002 | Bailie et al. | 340/445 |
| 6,507,276 B1 | 1/2003 | Young et al. | 340/447 |
| 6,518,875 B2 | 2/2003 | DeZorzi | 340/442 |
| 6,591,668 B1 * | 7/2003 | Becherer et al. | 73/146 |
| 6,662,642 B2 * | 12/2003 | Breed et al. | 73/146 |

* cited by examiner

*Primary Examiner*—Edward Lefkowitz
*Assistant Examiner*—Andre Allen
(74) *Attorney, Agent, or Firm*—The Law Office of Stanley K. Hill, PLC

(57) ABSTRACT

A tire positioning tool is provided that can be utilized to work with remote tire monitoring systems made by different manufacturers. The tire positioning tools are capable of activating RTMS tire sensors using one of a plurality of methods. Tire positioning tools can be manufactured that are cable of receiving signals from RTMS tire sensors using a plurality of different frequencies. Tire positioning tools can be manufactured that are also capable of transmitting data to a RTMS receiving unit and/or receiving data from a RTMS receiving unit using a plurality of signal frequencies. Using the provided tire positioning tool, a technician tasked to install a new tire or to rotate tires can utilize a single tool to work with remote tire monitoring systems made by different manufacturers.

22 Claims, 4 Drawing Sheets

REMOTE TIRE MONITORING SYSTEMS TOOL

FIELD OF THE INVENTION

The present invention relates to apparatus and methods useful for communicating with remote tire monitoring systems. More specifically, the present invention provides apparatus and methods that are capable of communicating with different remote tire monitoring systems made by different manufacturers.

BACKGROUND OF THE INVENTION

Remote tire monitoring systems ("RTMSs") are known in the art. Such systems typically include a plurality of sensor units or transmitters associated with the tires of a vehicle ("tire sensors"), such as an automobile, truck, or other wheeled vehicle, along with a receiving unit. The sensors measure a tire characteristic, most commonly the air pressure in the associated tire, and communicate data corresponding to the tire characteristic to the receiving unit on the vehicle. The data is typically communicated to the receiving unit via radio frequency ("RF") signals. The RF signals can be modulated and encoded to transmit data such as tire pressure, unique identifier, etc. The receiver typically takes some action in response to receiving the transmitted data, such as providing an alarm or providing a display to the operator of the vehicle indicative of the tire characteristic. Thus, if the air pressure in a tire is too low (or too high), the RTMS tire sensor detects the low air pressure and signals to the RTMS receiving unit, which then indicates to the operator of the vehicle which tire has the low air pressure.

In order for the receiver to reliably indicate the tire characteristic to the vehicle operator, the receiver preferably associates the tire sensor (and therefore, the tire characteristic data) with a tire position on the vehicle. This association is made upon initial installation of tires on the vehicle and must be repeated each time tire positions are changed, such as after tire rotation, or a new tire is installed.

A technician installing new tires on a vehicle or changing the positions of tires (that is, rotating tires) on a vehicle can program the vehicle's RTMS receiving unit to associate the tires on the vehicle with their tire positions by first putting the receiving unit into learn mode or programming mode and then activating the tire sensors in a sequence specified by the manufacturer of the RTMS receiving unit. The methods for putting receiving units into programming mode are typically manufacturer dependent, but are generally known in the ant. For example, it is known in the art that some RTMS receiving units manufactured by Ford Motor Company can be put into programming mode by first turning the ignition on (not in start position) and off three times, followed by depressing the vehicle's brake, followed by again turning the ignition on and off three times.

Once the receiving unit is placed into programming mode it will expect the tire sensors to be activated in a particular sequence. That is, the receiving unit may expect the tire sensor in the right front tire to be activated first, followed by the tire sensor in the left front tire, etc. The precise sequence for activating tire sensors is determined by and readily available from the manufacturer of the RTMS.

As each tire sensor is activated, it transmits a signal ("tire sensor signal") to the receiving unit. The tire sensor signal will typically contain a unique ID that identifies the particular tire (that is, tire sensor) that is transmitting the tire sensor signal. The receiving unit associates this unique ID with the position of the tire from which the signal is being transmitted. In this manner, the receiving unit learns the position of each tire as it is being activated. After each tire is activated, the receiving unit will typically emit a sound, such as a beeping sound, to indicate to the technician that the receiving unit received a tire sensor signal from the activated tire and that the next tire in the sequence can be then activated.

At any later point in time when a tire sensor is activated, it transmits its unique ID along with pertinent data about the tire (such as tire pressure, for example) and the receiving unit can then display the transmitted data as necessary to the operator of the vehicle, also indicating the tire position to the operator. For example, if while a vehicle is in operation the right front tire starts losing air pressure, the loss of air pressure is detected by the tire sensor in the right front tire, the tire sensor transmits the tire pressure to the receiving unit (along with its unique ID), the receiving unit determines the tire position (that is, right front) of the transmitting tire sensor from the previous association of unique ID to tire position and then indicates to the operator of the vehicle that the right front tire has low tire pressure.

SUMMARY OF THE INVENTION

Remote tire monitoring systems are produced by a plurality of manufacturers. RTMS tire sensors designed by different manufacturers typically utilize different methods for activating the tire sensors. For example, one RTMS manufacturer may build its tire sensors such that they are activated by a magnetic field that can be generated by a magnet. A second way that some tire sensors can be activated is by a change in air pressure in the tire. A third way that some tire sensors can be activated is by the rotation of the tire. A fourth way that some tire sensors can be activated is by temperature. RTMS manufacturers may also build tire sensors such that they are activated by a continuous wave low frequency ("LF") or radio frequency ("RF") signal. Still other RTMS manufacturers may build tire sensors such that they are activated by a modulated low frequency ("LF") or radio frequency ("RF") signal.

Additionally, different manufacturers frequently utilize different methods for transmitting data from the tire sensor (upon activation) to the receiving unit. For example, one manufacturer may build tire sensors such that they transmit, and the receiving units receive, data via a RF signal at a particular frequency, such as 315 MHz. A second manufacturer may build tire sensors such that they transmit data via a RF signal at a different frequency, such as 433 MHz. A third manufacture may build tire sensors such that they transmit data via a RF signal at yet another frequency, such as 916 MHz.

The present invention provides for a tire positioning tool that can be utilized to work with remote tire monitoring systems made by different manufacturers. Tire positioning tools of the present invention are capable of activating RTMS tire sensors using one of a plurality of means. Preferred tire positioning tools of the present invention are capable of receiving signals of a plurality of frequencies transmitted by activated RTMS tire sensors. Preferred tire positioning tools of the present invention are also capable of transmitting data to a RTMS receiving unit and/or receiving data from a RTMS receiving unit using one of a plurality of signal frequencies. In this manner, a technician tasked to install a new tire or to rotate tires can utilize a single tool to work with remote tire monitoring systems made by different manufacturers.

DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION OF PREFERRED EMBODIMENT OF THE INVENTION

Figure 1:
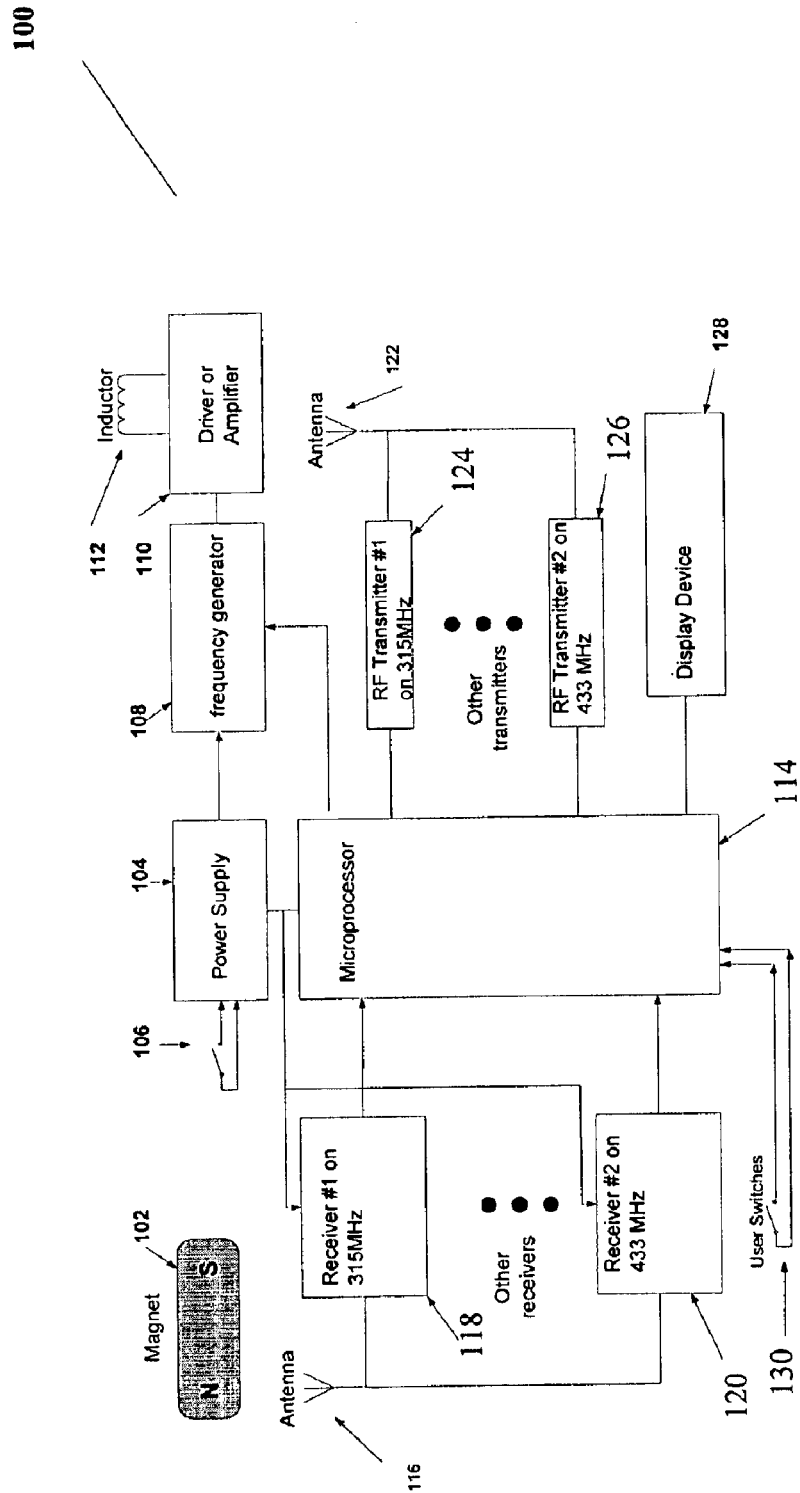
FIG. 1 illustrates a block diagram of a tire positioning tool according to the present invention.

In the following detailed description of preferred embodiments of the present invention, reference is made to the accompanying Drawings, which form a part hereof, and in which are shown by way of illustration specific embodiments in which the present invention may be practiced. It should be understood that other embodiments may be utilized and structural changes may be made without departing from the scope of the present invention.

The present invention provides for a tire positioning tool that can be utilized to work with a plurality of remote tire monitoring systems made by different manufacturers (that is, different makes of RTMSs). In a first embodiment, tire positioning tools of the present invention comprise a plurality of means for activating tire sensors and are thus capable of activating a plurality of makes of RTMS tire sensors. In a second embodiment, tire positioning tools of the present invention additionally comprise signal receiving circuitry capable of receiving data transmitted from a plurality of makes of activated RTMS tire sensors. In a third embodiment, tire positioning tools of the present invention comprise signal transmitting circuitry capable of transmitting data to a plurality of different makes of RTMS receiving units. In a fourth embodiment, tire positioning tools of the present invention additionally comprise signal receiving circuitry capable of receiving data transmitted from a plurality of makes of activated RTMS receiving units.

Remote tire monitoring systems are produced by a plurality of manufacturers. RTMS tire sensors designed by different manufacturers typically utilize different methods for activating the tire sensors. For example, one manufacturer may build its tire sensors such that they are activated by a magnetic field that can be generated by a magnet. Thus, if a magnet is placed within a short distance (typically, a few inches) of the tire sensor, the tire sensor will activate. A second way that some tire sensors can be activated is by a change in air pressure in the tire. That is, if the air pressure changes by a certain amount (typically about 5 psi) then the tire sensor activates. A third way that some tire sensors can be activated is by the rotation of the tire. Thus, whenever the tire rotates at a certain rate (or higher rate) the tire sensor will activate. A fourth way that some tire sensors can be activated is by temperature. In this manner, if a tire starts to become overheated, the tire sensor is activated. RTMS manufacturers may also build its tire sensors such that they are activated by radio frequency signals. Radio frequency signals having a frequency of less than about 30 MHz are typically referred to as low frequency ("LF") signals and signals having a frequency greater than about 30 MHz are typically referred to as radio frequency ("RF") signals. Accordingly, radio frequency signals having a frequency of less than or equal to 30 MHz are referred to herein as LF signals and radio frequency signals having a frequency of greater than 30 MHz are referred to herein as RF signals. Thus, a fifth way that some tire sensors may be activated is by a continuous wave LF signal or a continuous wave RF signal. Typically, these tire sensors will activate whenever they receive a continuous wave signal for a certain period of time (commonly, at least 6 seconds). Another RTMS manufacturer may build its tire sensors such that they are activated by a modulated LF or modulated RF signal. A LF or RF signal transmitted for the purpose of activating a RTMS tire sensor, whether continuous or modulated, is referred to herein as an activation signal.

Tire positioning tools of the present invention will comprise a plurality of means for activating tire sensors. Tire positioning tools of the present invention can be manufactured utilizing as few as two different means for activating tire sensors. Producing tire positioning tools of the present invention having as few as two different means for activating tire sensors may be useful, for example, if it is known that the tire positioning tool will only be used in circumstances requiring the tool to be used in conjunction with as few as two different known makes of RTMS. Tire positioning tools of the present invention having fewer different means for activating tire sensors will generally be less expensive to manufacture than tire positioning tools of the present invention having many different means for activating tire sensors. On the other hand, if it is known that the tire positioning tool of the present invention is intended to be utilized in circumstances requiring the tool to be used in conjunction with many different makes of RTMS, then a tire positioning tool according to the present invention can be manufactured with many different means for activating tire sensors.

One means for activating tire sensors that can be incorporated into tire positioning tools of the present invention involves the use of a magnet. Thus, tire positioning tools of the present invention can have a magnet attached to the tire positioning tool, typically being placed inside the tool. Some tire sensors are manufactured such that when the tire sensor is placed within a magnetic field as is generated by a magnet, the sensor becomes activated. Generally, a tire positioning tool containing a magnet will need to be positioned within a few inches of the tire sensor before the tire sensor is activated by the magnet. The types of magnets useful for activating tire sensors are known in the art and an appropriate magnet for inclusion in tire positioning tools of the present invention can be readily determined by one of ordinary skill in the art. When a technician is working with a remote tire monitoring system comprising tire sensors that are activated by a magnet, a technician can first put the RTMS receiving unit into programming mode and then use a tire positioning tool of the present invention on each tire in the appropriate sequence to activate the tire sensor by placing the tire positioning tool sufficiently close to the tire to put the tire sensor within the magnetic field of the magnet.

A second means for activating tire sensors that can be incorporated into tire positioning tools of the present invention involves the use of a valve core depressor. It is well known in the art to lower a tire's air pressure by depressing the valve core and letting air out of the tire. There are tools known in the art that are used to depress valve cores and let air out of a tire. These tools are referred to herein as valve core depressors. Tire positioning tools of the present invention can have a valve core depressor attached to or built into the casing of the tool making it easy for a technician to lower the air pressure in a tire. When a technician is working with a remote tire monitoring system comprising tire sensors that are activated by a change in tire pressure, a technician can first put the RTMS receiving unit into programming mode and then use a tire positioning tool of the present invention on each tire in the appropriate sequence to let out an amount of air sufficient to reduce the tire pressure enough to activate the tire sensor.

A third means for activating tire sensors that can be incorporated into tire positioning tools of the present invention involves the use of a continuous wave ("CW") LF or RF signal. Some tire sensors may be manufactured such that they are activated upon receiving a CW signal of a particular frequency. Means for generating CW signals at a specific frequency are known in the art and any means known in the art can be utilized for generating a CW signal in tire positioning tools of the present invention. One means for producing a CW signal in tire positioning tools of the present invention is to include frequency generating circuitry to generate the CW signal and then amplify the CW signal with an amplifier or a driver circuit. Frequency generating circuitry as well as amplifiers and driver circuitry are known in the art and can readily be incorporated into tire positioning tools of the present invention by one of ordinary skill in the art.

Tire positioning tools of the present invention may comprise frequency generating circuitry capable of generating a single frequency or may comprise frequency generating circuitry capable of generating a plurality of different frequencies. Different makes of RTMS tire sensors may require different frequencies of CW signal to be activated. Thus, each different frequency of CW signal generated constitutes a different means for activating RTMS tire sensors. If a tire positioning tool of the present invention is capable of generating a CW signal of only one frequency, then the tool will also comprise at least one other means of activating a RTMS tire sensor, such as a magnet. Most commonly, tire positioning tools of the present invention will comprise frequency generating circuitry capable of generating a plurality of different frequencies. The frequencies of the CW signals are chosen from frequencies that are known to activate different makes of RTMS tire sensors. Useful signals for CW signals in tire positioning tools of the present invention may include, for example, 125 KHz, 13.56 MHz, 928 MHz, and 2.4 GHz.

A fourth means for activating tire sensors that can be incorporated into tire positioning tools of the present invention involves the use of a modulated signal. Some tire sensors may be manufactured such that they are activated upon receiving a modulated signal of a particular frequency. Means for generating modulated signals at a specific frequency are known in the art and any means known in the art can be utilized for generating a modulated signal in tire positioning tools of the present invention. One means for producing a modulated signal in tire positioning tools of the present invention is to include a microprocessor in addition to frequency generating circuitry. As is known in the art, the microprocessor can provide the modulation to the frequency generator circuitry. An amplifier or driver circuit can also be included to amplify the signal.

Similar to the generated CW signal above, tire positioning tools of the present invention may be capable of generating a modulated signal at only a single frequency or may be capable of generating a modulated signal at one of a plurality of frequencies. Different makes of RTMS tire sensors may require different frequencies of modulated signal to be activated. Thus, each different frequency of modulated signal generated constitutes a different means for activating RTMS tire sensors. If a tire positioning tool of the present invention is capable of generating a modulated signal at only one frequency, then the tool will also comprise at least one other means of activating a RTMS tire sensor, such as a magnet or a means for transmitting a CW signal. Most commonly, tire positioning tools of the present invention will comprise a microprocessor and frequency generating circuitry capable of generating modulated signals at a plurality of different frequencies. The frequencies of the modulated signals are chosen from frequencies that are known to activate different makes of RTMS tire sensors. Useful frequencies for modulated signals in tire positioning tools of the present invention may include, for example, 125 KHz, 13.56 MHz, 928 MHz, and 2.4 GHz.

As mentioned above, tire positioning tools of the present invention comprise a plurality of means for activating RTMS tire sensors. The plurality of means for activating RTMS tire sensors may be any combination of the means discussed above. For example, tire positioning tools of the present invention may only include means for generating CW signals at two or more different frequencies and not include any other means for activating RTMS tire sensors. Similarly, tire positioning tools of the present invention may only include means for generating modulated signals at two or more different frequencies and not include any other means for activating RTMS tire sensors. Alternately, tire positioning tools or the present invention may include means for generating a CW signal at only one specific frequency and also include means for generating a modulated signal at only one specific frequency. Most commonly, tire positioning tools of the present invention will comprise a magnet, a core valve depressor, means for generating CW signals at two or more different frequencies, and means for generating modulated signals at two or more different frequencies.

One advantage of utilizing a plurality of means for activating RTMS tire sensors is that a technician can utilize a single tire positioning tool of the present invention to activate a plurality of makes of RTMS tires sensors. This can be done regardless of whether the technician is aware of the specific make of the RTMS tire sensor. Once a RMTS receiving unit has been put into programming mode, a technician can use a tire positioning tool of the present invention to activate the tire sensors in the appropriate order to indicate the position of each tire to the receiving unit.

Tire positioning tools of the present invention can be advantageously utilized for indicating tire position to a RTMS receiving unit. A technician utilizing a tire positioning tool of the present invention will first put the RTMS receiving unit into programming mode. Then the technician will use the tool to activate each tire sensor in the sequence expected by the receiving unit.

If the technician knows which manufacturer built the RTMS and which means is needed to activate the tire sensors, the technician will use that means to activate each tire. For example, if the technician knows that a CW signal at a particular frequency will activate the tire sensors, the technician approaches each tire in the appropriate sequence, places the tire positioning tool sufficiently close to the tire such that the tire sensor is within range for receiving a CW signal from the tire positioning tool, and then activates the tire position tool in such a manner that is generates a CW signal at the particular frequency desired. When the RTMS receiving unit indicates that a tire sensor signal has been received, the technician proceeds to the next tire in the sequence and activates its tire sensor. The technician similarly activates each tire sensor in the sequence until all tire sensors have been activated.

If the technician does not know which means is needed to activate the tire sensors, the technician can proceed to the first tire after putting the RTMS receiving unit into programming mode and try to activate the tire sensor using different means until the receiving unit indicates that it has received a tire sensor signal. For example, the technician may first attempt to activate the tire sensor by placing the tire sensor within the magnetic field of the tool's magnet. If the tire sensor does not activate (that is, the receiving unit does not indicate that a tire sensor signal has been received), the technician can attempt to activate the tire sensor by having the tool generate a CW signal at a particular frequency. If the tire sensor still does not activate, the technician can attempt to activate the tire sensor by having the tool generate a CW signal at a different frequency or generate a modulated signal at a particular frequency. Attempts to activate the tire sensor continue until either the tire sensor is activated or all available means for activating tire sensors have been attempted unsuccessfully. Once a means for successfully activating the first tire sensor in the sequence is determined, the technician can utilize that means for each of the remaining tires in the sequence without having to first try any other means.

Preferred embodiments of tire positioning tools of the present invention will also comprise means for receiving signals transmitted by activated RTMS tire sensors. Once a RTMS tire sensor has been activated, the tire sensor transmits data to the receiving unit via a LF or RF signal at a particular frequency (that is, a tire sensor signal). Preferred tire positioning tools of the present invention can also receive tire sensor signals. Preferred tire positioning tools of the present invention will comprise an antenna connected to receiving circuitry capable of receiving tire sensor signals. The receiving circuitry may comprise a single receiver capable of receiving a single frequency, a single receiver capable of receiving a plurality of frequencies, or multiple receivers each of which is capable of receiving a single frequency. Preferred tire positioning tools of the present invention will additionally comprise a microprocessor for decoding tire sensors signals. Antennas, receiving circuitry, and microprocessors useful in the present invention are known in the art and can be readily incorporated into tire positioning tools of the present invention by one of ordinary skill in the art. Different makes of RTMS tire sensors may transmit different frequencies of tire sensor signal. Thus, each different frequency of tire sensor signal that tire positioning tools of the present invention are capable of receiving constitutes a different means for receiving tire sensor signals. That is, if a tire positioning tool of the present invention comprises means for receiving tire sensor signals at a plurality of frequencies then the tire position tool comprises a plurality of means for receiving tire sensor signals.

Typically, preferred tire positioning tools will be capable of receiving a plurality of frequencies of tire sensor signals. This can be accomplished by including a plurality of receivers into tire positioning tools of the present invention, wherein each receiver is designed to receive a signal of a particular frequency. Alternately, this can be accomplished by including a single receiver capable of receiving multiple different frequencies. For each frequency of signal known to be transmitted by a RTMS tire sensor, receiving circuitry can be included into tire position tools of the present invention such that the tire position tool can receive and decode the tire sensor signal at that frequency. Frequencies of RTMS tire sensor signals useful for tire positioning tools of the present invention to receive may include, for example, 125 KHz, 13.56 MHz, 315 MHz, 433 MHz, 848 MHz, 916 MHz, and 2.4 GHz.

Whether to include a single receiver capable of receiving a plurality of frequencies or whether to include a plurality of receiver each of which is capable of receiving a single frequency is more of an economic decision than a technical one. Receivers capable of receiving a plurality of frequencies are generally more expensive to manufacture than receivers capable of receiving a single frequency. If the tire positioning tool is designed to receive only a few different frequencies, it may be more economical to include multiple receivers each receiving a single frequency. However, if the tire positioning tool is designed to receive many different frequencies, then it may be more economical to include a single receiver capable of receiving all the targeted frequencies.

The number of frequencies that tire positioning tools of the present invention are capable of receiving can be adapted to the particular environment in which the tool will be used by a technician. Tire positioning tools capable of receiving a larger number of different frequencies may be used in conjunction with a larger number of makes of remote tire monitoring systems, but tire positioning tools capable of receiving fewer different frequencies will typically be less expensive to manufacture.

RTMS tire sensor signals received by tire positioning tools of the present invention transmit data to the tire positioning tool that can be advantageously displayed. For example, tire sensors may transmit, via tire sensor signals, data such as unique ID, tire pressure, tire temperature, etc. Preferred tire positioning tools of the present invention will include a display apparatus that can be advantageously utilized to display the transmitted data in a manner making it readable to the technician utilizing the tire positioning tool. Display apparatus that can be advantageously incorporated into tire positioning tools of the present invention are known in the art and may include, for example, LED devices, LCD devices, VF devices, or other devices.

Tire positioning tools of the present invention capable of receiving tire sensor signals can be advantageously utilized by a technician in a variety of ways. For example, if a technician simply wants to determine if the tire sensor of a tire is operational, the technician can utilize the tool to activate the tire sensor. If the tire sensor's data (that is, unique ID, tire pressure, etc.) is displayed, the technician knows the tire sensor is operational. A technician may also use tire positioning tools of the present invention to check the air pressure in each of the tires to ensure that the pressure in each tire is at an adequate level. When a technician balances a tire, the technician places the tire on a device that rotates the tire. This rotation may activate the tire sensor, allowing the technician to receive the tire sensor's data while the tire is rotating. Of course, the technician can also use the tool to activate a tire while it is rotating.

Preferred embodiments of tire positioning tools of the present invention will additionally comprise means for transmitting signals to RTMS receiving units. Such means will typically comprise an antenna connected to transmitting circuitry for transmitting signals and a microprocessor for encoding signals. The transmitting circuitry may comprise a single transmitter capable of transmitting a single frequency, a single transmitter capable of transmitting a plurality of frequencies, or multiple transmitters each of which is capable of transmitting a single frequency. Preferred tire positioning tools of the present invention will additionally comprise a microprocessor for signals transmitted to receiving units. Antennas, transmitting circuitry, and microprocessors useful in the present invention are known in the art and can be readily incorporated into tire positioning tools of the present invention by one of ordinary skill in the art. Different makes of RTMS receiving units may receive different frequencies of signal. Thus, each different frequency of signal that tire positioning tools of the present invention are capable of transmitting constitutes a different means for transmitting signals. That is, if a tire positioning tool of the present invention comprises means for transmitting signals at a plurality of frequencies then the tire position tool comprises a plurality of means for transmitting signals.

Typically, preferred tire positioning tools will be capable of transmitting a plurality of frequencies of signals to receiving units. This can be accomplished by including a plurality of transmitters into tire positioning tools of the present invention, wherein each transmitter is designed to transmit a signal of a particular frequency. Alternately, this can be accomplished by including a single transmitter capable of transmitting multiple different frequencies. For each frequency of signal known to be received by a RTMS receiving unit, transmitting circuitry can be included into tire position tools of the present invention such that the tire position tool can encode and transmit a signal at that frequency. Frequencies of signals useful for tire positioning tools of the present invention to transmit may include, for example, 125 KHz, 13.56 MHz, 315 MHz, 433 MHz, 848 MHz, 916 MHz, and 2.4 GHz.

Whether to include a single transmitter capable of transmitting a plurality of frequencies or whether to include a plurality of transmitters each of which is capable of transmitting a single frequency is more of an economic decision than a technical one. Transmitters capable of transmitting a plurality of frequencies are generally more expensive to manufacture than transmitters capable of transmitting a single frequency. If the tire positioning tool is designed to transmit only a few different frequencies, it may be more economical to include multiple transmitters each transmitting a single frequency. However, if the tire positioning tool is designed to transmit many different frequencies, then it may be more economical to include a single transmitter capable of transmitting all the targeted frequencies.

The number of frequencies that tire positioning tools of the present invention are capable of transmitting can be adapted to the particular environment in which the tool will be used by a technician. Tire positioning tools capable of transmitting a larger number of different frequencies may be used in conjunction with a larger number of makes of remote tire monitoring systems, but tire positioning tools capable of transmitting fewer different frequencies will typically be less expensive to manufacture.

In this manner, preferred tire positioning tools of the present invention can receive a signal from an activated RTMS tire sensor, decode the signal, add additional data such as tire position as necessary or desired, encode the data, and transmit the encoded data via a signal to the vehicle's receiving unit. Different makes of RTMS receiving units may be designed to receive different frequencies of signals. Thus, each different frequency of signal that tire positioning tools of the present invention are capable of transmitting to a receiving unit constitutes a different means for transmitting such signals. That is, if a tire positioning tool of the present invention comprises means for transmitting signals to receiving units at a plurality of different frequencies then the tire position tool comprises a plurality of means for transmitting such signals.

Similar to having means for receiving tire sensor signals at multiple different frequencies, preferred embodiments of tire positioning tools of the present invention may also include means for receiving signals transmitted by RTMS receiving units. In this manner, the tire positioning tool can interact with a vehicle's receiving unit by both receiving signals from and transmitting signals to the vehicle's receiving unit. Different makes of RTMS receiving units may transmit different frequencies of signals. Thus, each different frequency of such signal that tire positioning tools of the present invention are capable of receiving constitutes a different means for receiving such signals. That is, if a tire positioning tool of the present invention comprises means for receiving signals from RTMS receiving units at a plurality of different frequencies then the tire position tool comprises a plurality of means for receiving such signals.

FIG. 1 illustrates a block diagram of a preferred embodiment of a tire positioning tool of the present invention 100. The tool 100 comprises a magnet 102 that can be advantageously utilized to activate RTMS tire sensors that can be activated when placed within a magnetic field generated by a magnet. The tool 100 also comprises a power supply 104 and a switch 106 for providing power to the electronic circuits of tool 100. The power supply 104 will typically be a battery. When switch 106 is closed the power supply 104 provides power to the tool's electronic circuits. Frequency generator 108, amplifier 110, and inductor 112 are used to send signals for activating RTMS tire sensors (that is, activation signals). Microprocessor 114 can be advantageously utilized in various ways known in the art to modulate signals, encode signals, decode signals, etc. For purposes of the present specification the term microprocessor is intended to include devices such as those referred to in the art as microcontollers. Microprocessor 114 can also be advantageously utilized in conjunction with memory devices (not shown) to execute computer programs for controlling tire positioning tools of the present invention.

Antenna 116 is designed to receive signals from either a RTMS tire sensor or a RTMS receiving unit. FIG. 1 illustrates an embodiment of a tire positioning tool comprising two receivers, the first receiver 118 is capable of receiving signals at a frequency of 315 MHz, and the second receiver 120 is capable of receiving signals at a frequency of 433 MHz. The ellipsis between the two receivers is an indication that other embodiments of tire position tools may comprise additional receivers capable of receiving signals at other frequencies. Microprocessor 114 can be utilized to decode signals received by one of the receivers.

Antenna 122 is designed to transmit signals to either a RTMS receiving unit or a RTMS tire sensor. FIG. 1 illustrates an embodiment of a tire positioning tool comprising two transmitters, the first transmitter 124 is capable of transmitting signals at a frequency of 315 MHz, and the second transmitter 126 is capable of transmitting signals at a frequency of 433 MHz. The ellipsis between the two transmitters is an indication that other embodiments of tire position tools may comprise additional transmitters capable of transmitting signals at other frequencies. Microprocessor 114 can be utilized to encode signals transmitted by one of the transmitters.

As is illustrated in FIG. 1, tire positioning tools of the present invention will typically also comprise a display device for visually communicating information to the operating technician. Display device 128 may be an LED device, an LCD device, a VF device, or any other device known in the art useful for displaying information to an operating technician. The type of information displayed may include, for example, unique tire ID, tire pressure, and tire temperature.

The tire positioning tool embodiment illustrated in FIG. 1 also comprises user switches 130. User switches 130 can be utilized by a technician to switch between different modes of operation. Different embodiments of the present invention may have different modes of operation. For example, one mode of operation might involve activating RTMS tire sensors and displaying the information on the display device 128. Another mode of operation might involve a technician inputting information into a tire positioning tool so that the information can be transmitted to a RTMS receiving unit. Another mode of operation might involve a tire positioning tool transmitting information to a vehicle's RTMS receiving unit. The types of information that can be input into a tire positioning tool may include, for example, tire location, warning levels (for example, temperature and/or pressure levels that if reached in a tire should trigger a receiving unit to warn a vehicle operator), brand of tire, brand of sensor, and date of service. In a preferred embodiment of the present invention, a technician can put the tire position tool in one mode to activate and receive information from a tire sensor (unique ID and tire pressure, for example), put the tool in a second mode to allow the technician to input information (tire location, for example), and then put the tool in a third mode to transmit the information received from the tire sensor along with the inputted information to the receiving unit.

Figure 2:
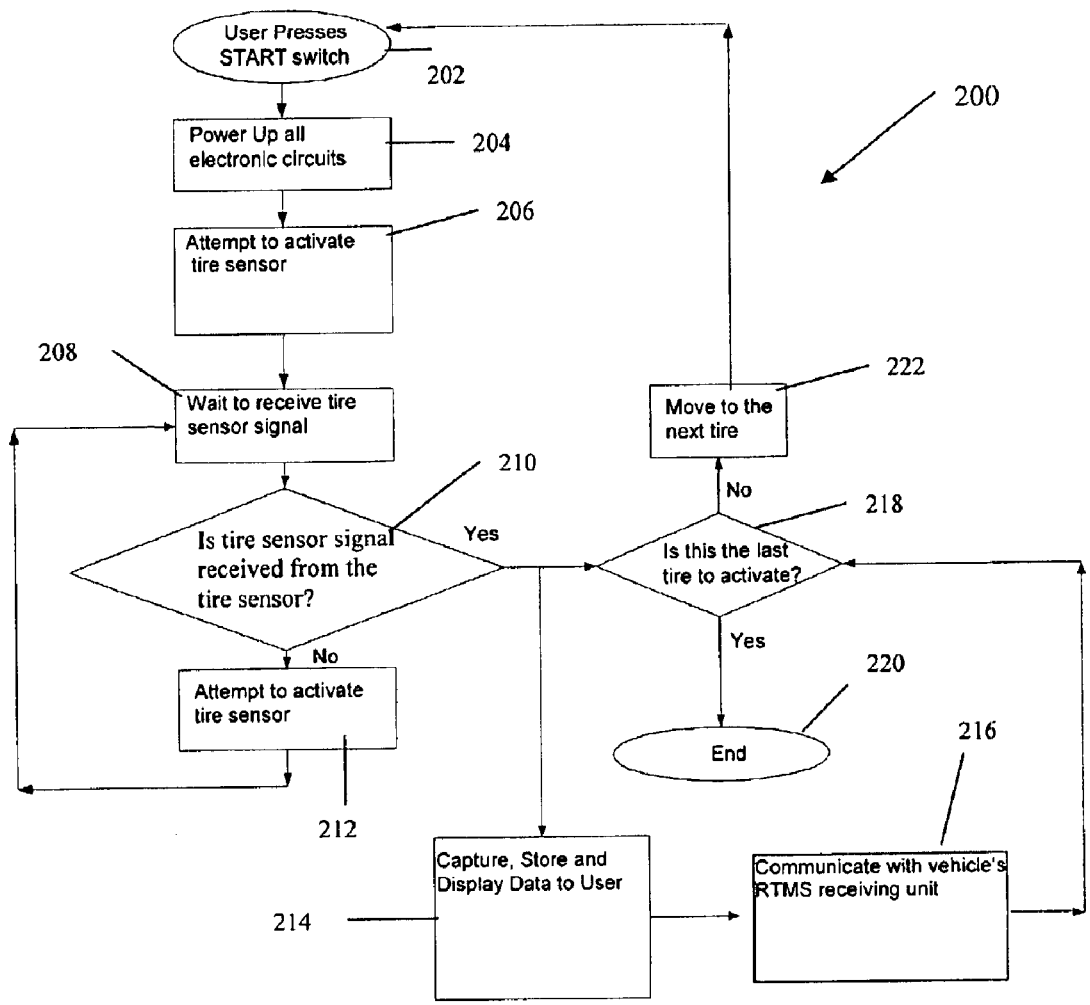
FIG. 2 illustrates a flowchart representing an embodiment of a method according to the present invention.

FIG. 2 illustrates a flowchart representing an embodiment of a method 200 according to the present invention. Methods such as the method 200 illustrated in FIG. 2 can be implemented in a tire positioning tool's microprocessor by one of ordinary skill in the art of computer programming.

A technician starts the use of the tire positioning tool by pressing a start switch 202, such as the switch 106 shown in FIG. 1. Pressing the start switch 202 causes all of the electronic circuits of the tool to power up 204. Next, the tire positioning tool attempts to activate a tire sensor 206 by utilizing one of the plurality of means capable of activating remote tire monitoring system tire sensors. This can be done, for example, by transmitting an activation signal, by placing the tire positioning tool sufficiently close to the tire sensor to put it within the magnetic field of any magnet present in the tire positioning tool, or by utilizing a tool's valve core depressor (if present). When transmitting an activation signal, the tool attempts to activate the targeted tire sensor by transmitting either a CW signal or a modulated signal at a particular frequency.

In preferred embodiments of the present invention, the tire positioning tool records the most recent means of activation signal that was utilized to successfully activate a tire sensor and the recorded means of activation signal is the first means of activation signal to be used when first attempting to activate the tire sensor 206. Generally, all tire sensors of a given make use the same means of signal to activate. And generally, all tire sensors on a vehicle will be of the same make. Accordingly, if a technician has already activated one or more tires on a vehicle then the activation signal for the next tire will be the same means of activation signal as was just utilized on the previous tires. Thus, recording the last successful activation signal saves time because after the first tire in a sequence is activated the same means of activation signal can be utilized on the next tire without first having to try many other means of activation signals. The most recent successful type of activation signal can be recorded by any appropriate means. For example, each activation signal means can be associated with a unique number and whenever an activation signal is successful the unique number can be stored by the microprocessor. When attempting to activate a tire sensor 206, the microprocessor can retrieve the last stored unique number and utilize the associated activation signal means in the attempt to activate a tire sensor 206.

After the tire positioning tool attempts to activate the tire sensor 206, the tool waits for a period of time sufficient to receive a tire sensor signal 208. The tire positioning tool must wait long enough to provide the tire sensor enough time to become activated, to provide enough time to transmit a tire sensor signal, and to provide enough time for the tire positioning tool to receive the tire sensor signal. For example, some tire sensors must receive a continuous wave signal for at least 6 seconds before they will activate. The period of time for which a tire positioning tool will wait to receive a tire sensor signal will typically be no more than about 10 seconds. The tire positioning tool then determines whether a tire sensor signal has been received 210 within the period of time. If not, the tool attempts to activate the tire sensor 212 utilizing a different means of activating remote tire monitoring system tire sensors. For example, if the previous attempt to activate the tire sensor utilized a CW signal at a particular frequency, then the current attempt could transmit a CW signal at a different frequency or could transmit a modulated signal at a particular frequency. After this latest attempt to activate the tire sensor 212, the tool will again wait to receive a tire sensor signal 208. This loop of attempting to activate the tire sensor 212, waiting to receive a tire sensor 208, and determining whether a tire sensor has been received 210 continues until a tire sensor is received or all means of activating tire sensors have been attempted.

Once a tire sensor signal has been received, preferred embodiments of the present invention can store and display the data 214. Preferred embodiments of the present invention can also communicate with a vehicle's RTMS receiving unit 216. The communication with a vehicle's RTMS receiving unit 216 may pass on additional information to the receiving unit, such as tire position, for example. Either or both of the steps 214 and 216 can be skipped in various embodiments of the present invention.

Once steps 214 and 216 are both completed or skipped, the tire position tool determines if the tire sensor just activated was the last tire sensor to be activated 218. If so, all tire sensors have been activated and the tire positioning tool can be turned off 220 or used on another vehicle to install or rotate tires. If not, the tire positioning tool is moved to the next tire 222 having a tire sensor that needs to be activated and the start switch is pressed 202 to activate the next tire sensor.

Figure 3:
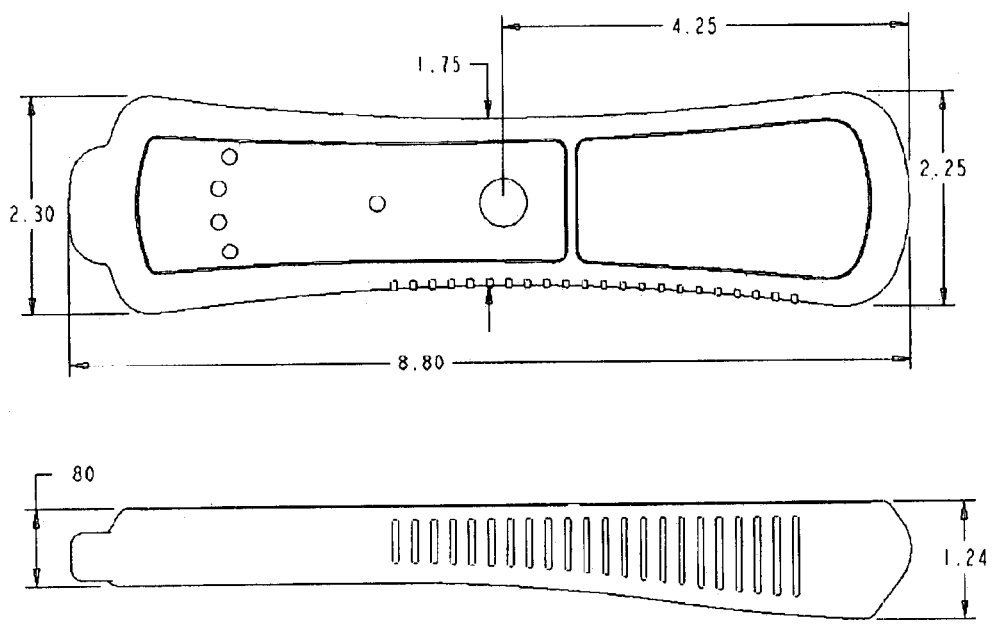
FIG. 3 illustrates an embodiment of a tire positioning tool according to the present invention.
Figure 4:
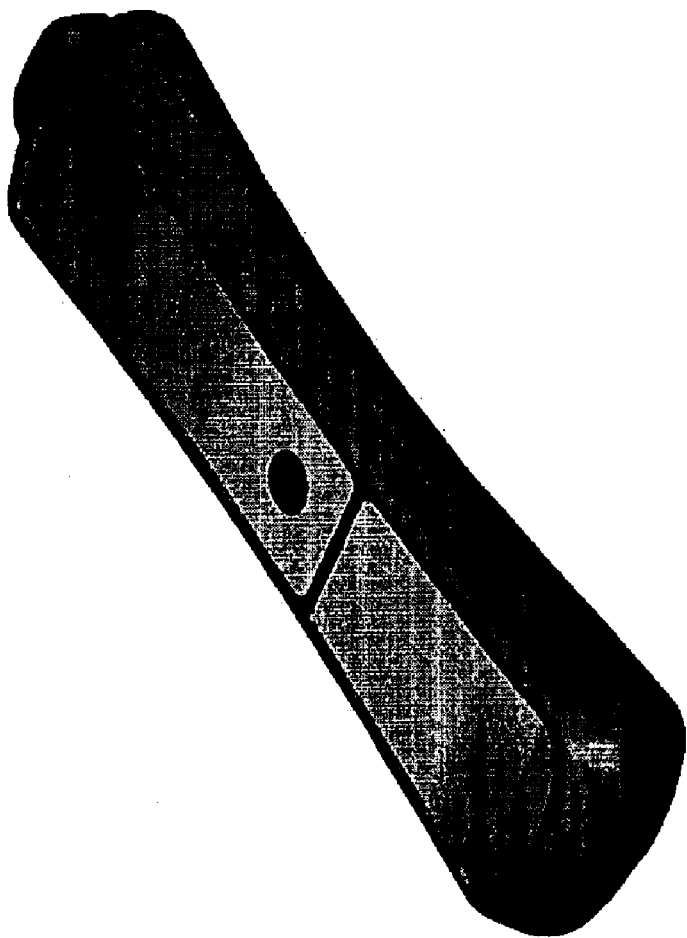
FIG. 4 illustrates an embodiment of a tire positioning tool according to the present invention.

The components of tire positioning tools of the present invention can be integrated by one of ordinary skill in the electronic arts to fit in a casing that is sufficiently small to be easily carried and handled by a technician. FIG. 3 illustrates a schematic of an embodiment of the present invention. FIG. 4 illustrates another schematic of an embodiment of the present invention.

While the present invention has been described in detail with respect to specific embodiments thereof, it will be appreciated that those skilled in the art, upon attaining an understanding of the foregoing, may readily conceive of alterations to, variations of and equivalents to these embodiments. Accordingly, the scope of the present invention should be assessed as that of the appended claims and by equivalents thereto.

What is claimed is:

1. A tool comprising a plurality of means for activating remote tire monitoring system tire sensors, the plurality of means selected from the group consisting of a magnet, a valve core depressor, means for generating continuous wave signals, and means for generating modulated signals, wherein the tool is capable of activating a plurality of tire sensors, each of the plurality of tire sensors utilizing a different method for activating the said tire sensor.

2. The tool of claim 1, wherein the tool comprises a magnet and at least one means for generating a continuous wave signal.

3. The tool of claim 1, wherein the tool comprises a magnet and at least one means for generating a modulated signal.

4. The tool of claim 1, wherein the tool comprises at least one means for generating a continuous wave signal and at least one means for generating a modulated signal.

5. The tool of claim 1, wherein the tool comprises a plurality of means for generating continuous wave signals.

6. The tool of claim 1, wherein the tool comprises a plurality of means for generating modulated signals.

7. A tool, comprising:
a plurality of means for activating remote tire monitoring system tire sensors, the plurality of means selected from the group consisting of a magnet, a valve core depressor, means for generating continuous wave signals, and means for generating modulated signals; and
a means for receiving tire sensor signals,
wherein the tool is capable of activating a plurality of tire sensors, each of the plurality of tire sensors utilizing a different method for activating the said tire sensor.

8. The tool of claim 7, wherein the means for receiving tire sensor signals is selected from the group of means capable of receiving tire sensor signals at frequencies of 125 KHz, 13.56 MHz, 315 MHz, 433 MHz, 848 MHz, 916 MHz, and 2.4 GHz.

9. A tool, comprising:
a plurality of means for activating remote tire monitoring system tire sensors, the plurality of means selected from the group consisting of a magnet, a valve core depressor, means for generating continuous wave signals, and means for generating modulated signals; and
a plurality, of means for receiving tire sensor signals,
wherein the tool is capable of activating a plurality of tire sensors, each of the plurality of tire sensors utilizing a different method for activating the said tire sensor.

10. The tool of claim 9, wherein the plurality of means for receiving tire sensor signals is selected from the group of means capable of receiving tire sensor signals at frequencies of 125 KHz, 13.56 MHz, 315 MHz, 433 MHz, 848 MHz, 916 MHz, and 2.4 GHz.

11. A tool, comprising:
a plurality of means for activating remote tire monitoring system tire sensors, the plurality of means selected from the group consisting of a magnet, a valve core depressor, means for generating continuous wave signals, and means for generating modulated signals;
a means for receiving tire sensor signals; and
display apparatus for displaying data received from tire sensor signals,
wherein the tool is capable of activating a plurality of tire sensors, each of the plurality of tire sensors utilizing a different method for activating the said tire sensor.

12. The tool of claim 11, wherein the display apparatus is a LED device, a LCD device, or a VF device.

13. A tool, comprising:
a plurality of means for activating remote tire monitoring system tire sensors, the plurality of means selected from the group consisting of a magnet, a valve core depressor, means for generating continuous wave signals, and means for generating modulated signals;
a means for receiving tire sensor signals; and
a means for transmitting signals to remote tire monitoring system receiving units,
wherein the tool is capable of activating a plurality of tire sensors, each of the plurality of tire sensors utilizing a different method for activating the said tire sensor.

14. The tool of claim 13, wherein the means for transmitting signals to remote tire monitoring receiving units is selected from the group of means capable of transmitting signals at frequencies of 125 KHz, 13.56 MHz, 315 MHz, 433 MHz, 848 MHz, 916 MHz, and 2.4 GHz.

15. A tool, comprising:
a plurality of means for activating remote tire monitoring system tire sensors, the plurality of means selected from the group consisting of a magnet, a valve core depressor, means for generating continuous wave signals, and means for generating modulated signals;
a means for receiving tire sensor signals;
a means for transmitting signals to remote tire monitoring system receiving units; and
a means for receiving signals transmitted by remote tire monitoring system receiving units,
wherein the tool is capable of activating a plurality of tire sensors, each of the plurality of tire sensors utilizing a different method for activating the said tire sensor.

16. A tool, comprising:
a means for receiving tire sensor signals; and
a means for transmitting signals to remote tire monitoring system receiving units,
wherein the tool is capable of adding data to a received tire sensor signal and transmitting the said added data to a remote tire monitoring system receiving unit.

17. A method, comprising the steps of:
attempting to activate a remote tire monitoring system tire sensor using a first means for activating remote tire monitoring system tire sensors;
waiting to receive a tire sensor signal;
attempting to activate the remote tire monitoring system tire sensor using a different means for activating remote tire monitoring system tire sensors if no tire sensor signal has been received; and
repeating the waiting step and the second attempting step until either a tire sensor signal is received or no different means for activating remote tire monitoring system tire sensors is available.

18. A method, comprising the steps of:
attempting to activate a remote tire monitoring system tire sensor using a first means for activating remote tire monitoring system tire sensors;
waiting to receive a tire sensor signal;
attempting to activate the remote tire monitoring system tire sensor using a different means for activating remote tire monitoring system tire sensors if no tire sensor signal has been received;
recording the most recent means used for attempting to activate the remote tire monitoring tire sensor if a tire sensor signal is received; and
repeating the waiting step and the second attempting step until either a tire sensor signal is received or no different means for activating remote tire monitoring system tire sensors is available.

19. A method, comprising the steps of:
attempting to activate a first remote tire monitoring system tire sensor using a first means for activating remote tire monitoring system tire sensors;
waiting to receive a tire sensor signal;
attempting to activate the first remote tire monitoring system tire sensor using a different means for activating remote tire monitoring system tire sensors if no tire sensor signal has been received;
recording the most recent means used for attempting to activate the remote tire monitoring tire sensor if a tire sensor signal is received;
repeating the waiting step and the second attempting step until either a tire sensor signal is received or no different means for activating remote tire monitoring system tire sensors is available; and
activating a second remote tire monitoring system tire sensor using the recorded means.

20. A method, comprising the steps:
activating a remote tire monitoring system tire sensor;
receiving a tire sensor signal containing data from the activated tire sensor; and
transmitting some or all of the data received from the tire sensor to a remote tire monitoring system receiving unit, wherein the activating step, the receiving step, and the transmitting step are all performed by a single tool, and wherein the tool comprises a plurality of means for activating remote tire monitoring system tire sensors.

21. The method of claim 20, wherein the data transmitted to the remote tire monitoring system includes additional data added to the data received from the remote tire monitoring tire sensor.

22. The method of claim 21, wherein the additional data includes the tire position of the remote tire monitoring system tire sensor.

* * * * *

UNITED STATES PATENT AND TRADEMARK OFFICE
CERTIFICATE OF CORRECTION

PATENT NO. : 6,904,796 B2
DATED : June 14, 2005
INVENTOR(S) : Thomas Kenny et al.

It is certified that error appears in the above-identified patent and that said Letters Patent is hereby corrected as shown below:

Title page,
Item [57], ABSTRACT,
Line 6, delete "cable" and insert -- capable --, therefor.

Column 1,
Line 49, delete "ant" and insert -- art --, therefor.

Column 3,
Line 3, delete "arc" and insert -- are --, therefor.

Column 10,
Line 30, delete "microcontollers" and insert -- microcontrollers --, therefor.

Column 13,
Line 41, after "plurality" delete ",".

Column 16,
Line 1, after "steps" insert -- of --.
Line 12, after "system" insert -- receiving unit --.

Signed and Sealed this

Eleventh Day of October, 2005

JON W. DUDAS
*Director of the United States Patent and Trademark Office*